United States Patent
Pancholi et al.

(10) Patent No.: US 8,364,824 B2
(45) Date of Patent: Jan. 29, 2013

(54) REDUCING THE LEARNING CURVE OF A TRANSMISSION CONTROL PROTOCOL CONNECTION

(75) Inventors: Ketan Priyakant Pancholi, Austin, TX (US); Vasu Vallabhaneni, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/130,440

(22) Filed: May 30, 2008

(65) Prior Publication Data

US 2008/0228931 A1   Sep. 18, 2008

Related U.S. Application Data

(63) Continuation of application No. 11/221,553, filed on Sep. 8, 2005, now abandoned.

(51) Int. Cl.
*G06F 15/16* (2006.01)
(52) U.S. Cl. .................................. 709/227; 709/228
(58) Field of Classification Search ............ 709/227, 709/228, 229, 230, 245
See application file for complete search history.

(56) References Cited

U.S. PATENT DOCUMENTS

| | | | |
|---|---|---|---|
| 5,892,753 A | 4/1999 | Badt et al. | |
| 6,324,582 B1 * | 11/2001 | Sridhar et al. | 709/230 |
| 6,446,121 B1 * | 9/2002 | Shah et al. | 709/224 |
| 2003/0163341 A1 | 8/2003 | Banerjee et al. | |
| 2003/0187975 A1 | 10/2003 | Brown et al. | |
| 2005/0086373 A1 | 4/2005 | Banerjee et al. | |
| 2006/0031536 A1 * | 2/2006 | Eydelman et al. | 709/228 |
| 2006/0239280 A1 * | 10/2006 | Warrier et al. | 370/401 |

FOREIGN PATENT DOCUMENTS

WO   03084145 A1   10/2003

OTHER PUBLICATIONS

P. Mockapetris, "RFC 1035: Domain Names-Implementation and Specification" IETF Request for Comments, Nov. 1987, pp. 1-54; www.ietf.org/rfc/rfc1035.text.*
U.S. Appl. No. 10/870,541, filed Jun. 17, 2004, Banerjee et al.
U.S. Appl. No. 10/875,897, filed Jun. 24, 2004, Fernandes et al.
U.S. Appl. No. 11/130,694, filed May 17, 2005, Fernandes et al.
Mockapetris, "Domain Names—Implementation and Specification", Nov. 1987, RFC 1035, pp. 1-47.

* cited by examiner

*Primary Examiner* — Liangche A Wang
*Assistant Examiner* — Cheikh Ndiaye
(74) *Attorney, Agent, or Firm* — Yee & Associates, P.C.

(57) ABSTRACT

A method in a data processing system for reducing the learning curve of a transmission control protocol connection. A domain name system is queried for information. The information and a previously used transmission control protocol parameter for a transmission control protocol connection are received from the domain name system. The information and the previously used transmission control protocol parameter are used to configure a current transmission control protocol connection.

19 Claims, 3 Drawing Sheets

REDUCING THE LEARNING CURVE OF A TRANSMISSION CONTROL PROTOCOL CONNECTION

This application is a continuation of application Ser. No. 11/221,553, filed Sep. 8, 2005, status pending.

BACKGROUND OF THE INVENTION

1. Field of the Invention

The present invention relates generally to an improved data processing system, in particular, to a method, system, and computer program product for optimizing performance in a data processing system. Still more particularly, the present invention provides a method, system, and computer program product for reducing the learning curve of a transmission control protocol connection.

2. Description of the Related Art

A domain name system (DNS) is a general-purpose distributed, replicated, data query service chiefly used on the Internet for translating hostnames, the unique name by which a computer is known on a network, into Internet addresses, the 32-bit host address usually represented in dotted decimal notation, such as 128.121.4.5. The address can be split into a network number (or network address) and a host number unique to each host on the network and sometimes also a subnet address. A user application program may perform a data query by supplying a host name to a domain name system using a query such as, for example, GetHostByName. The domain name system may respond to the query by providing the user with the Internet address corresponding to the host name. A domain name system can be configured to use a sequence of name servers, based on the domains in the name being looked for, until a host name match is found.

Most user application programs use domain name systems before establishing a transmission control protocol (TCP) connection in order to resolve, or translate, any host name into an Internet Protocol address. Consequently, each application program has a learning curve for its transmission control protocol connection, a period of time spent setting up required transmission control protocol parameters for the connection. Because the transmission control protocol connection parameters are the same or similar for applications sharing the same subnet or the same domain, much of this set up time is spent duplicating set ups previously completed on the same subnet or the same domain.

SUMMARY OF THE INVENTION

The present invention is a method, system, and computer program product in a data processing system for reducing the learning curve of a transmission control protocol connection. A foreign name server is queried for information. The information and a previously used transmission control protocol parameter for a transmission control protocol connection are received from the domain name system. The information and the previously used transmission control protocol parameter are used to configure a current transmission control protocol connection.

BRIEF DESCRIPTION OF THE DRAWINGS

The novel features believed characteristic of the invention are set forth in the appended claims. The invention itself, however, as well as an illustrative mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
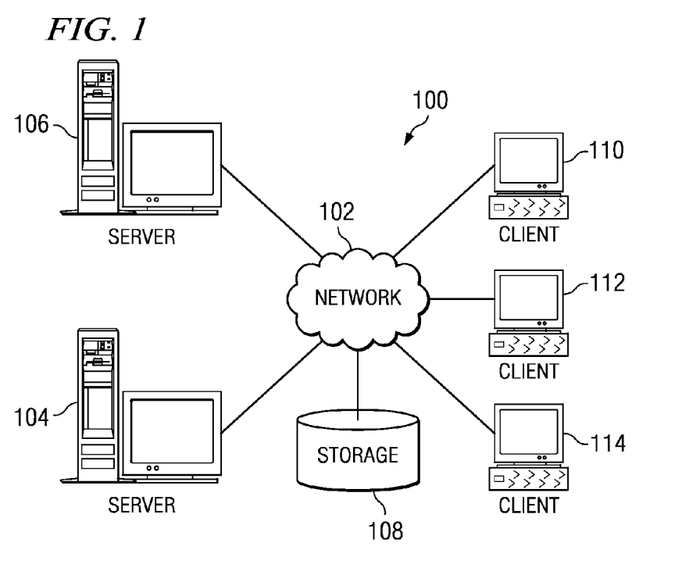
FIG. 1 is a pictorial representation of network of a data processing system in which aspects of the present invention may be implemented, according to an illustrative embodiment of the present invention.
Figure 2:
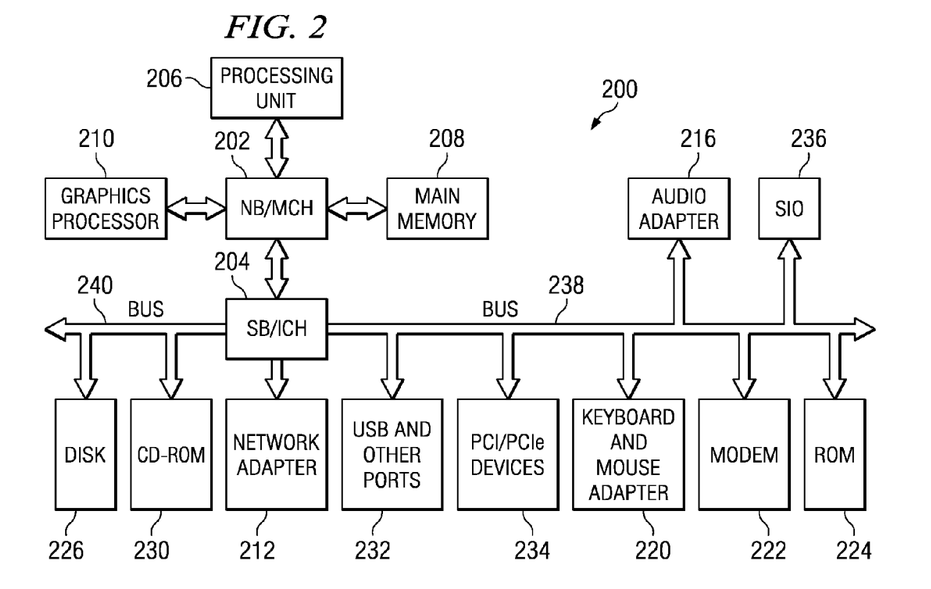
FIG. 2 is a block diagram of a data processing system in which aspects of the present invention may be implemented, according to an illustrative embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to SB/ICH 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or the LINUX operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Most user application programs use a name server to query a domain name system to resolve the IP addresses before establishing a transmission control protocol (TCP) connection. Because the TCP connection parameters are the same or similar for applications sharing the same subnet or the same domain, much of this set up time is spent duplicating set ups previously completed on the same subnet or the same domain.

With the present invention, an application program may reduce its learning curve for establishing a transmission control protocol connection. The application program may employ an application program interface to query a domain name system for an Internet address by supplying the domain name system with a host name. Upon receiving the query, the domain name system sends the Internet address for the supplied host name to the application program interface.

Embodiments of the present invention modify the domain name system to also send transmission control protocol connection parameters in the same response to the query for the supplied host name to the application program interface. Examples of transmission control protocol connection parameters include round trip time, duplicate acknowledgement threshold, next-hop router, path maximum transmission units, and the like, and will be described further in FIG. 3 below.

The application program interface sends the Internet address and transmission control protocol connection parameters for the host name to the user application program, which in turn sends the transmission control protocol connection parameters to the kernel of the operating system. The kernel of the operating system may then use the transmission control protocol connection parameters to configure a transmission control protocol connection to provide a reduced learning curve for the transmission control protocol connection.

If the kernel of the operating system configures the transmission control protocol connection without any transmission control protocol connection parameters recently used for the subnet path from the application program to the host, the kernel of the operating system must use default values for the initial transmission control protocol connection parameters that may not prove to be very accurate. An increased learning curve for the transmission control protocol connection results when the kernel of the operating system has to make many adjustments to the transmission control protocol connection parameters over time to reflect the actual transmission control protocol connection parameters.

In contrast, a reduced learning curve for the transmission control protocol connection results when the kernel of the operating system uses the transmission control protocol connection parameters most recently used and stored at the foreign name server for the subnet path from the application program to the host, minimizing the number of adjustments to the transmission control protocol connection parameters that have to be made over time made by the kernel of the operating system.

Figure 3:
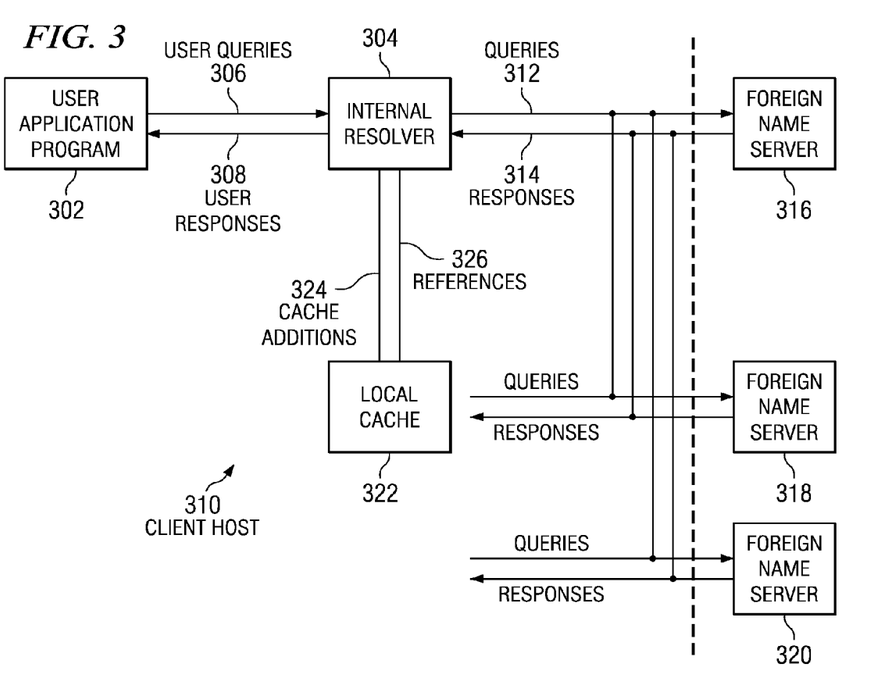
FIG. 3 is a block diagram illustrating examples of components used for reducing the learning curve of a transmission control protocol connection, according to an illustrative embodiment of the present invention.

FIG. 3 is a block diagram illustrating examples of a domain name system, including components used for reducing the learning curve of a transmission control protocol connection, according to an illustrative embodiment of the present invention. Client host 310 may be implemented using a component of a network for the data processing system in FIG. 1, such as client 110, client 112, or client 114. Foreign name servers 316-320 may be implemented using components of a network for the data processing system in FIG. 1, such as server 104 or server 106.

In this illustrative example, client host 310 comprises user application program 302, internal resolver 304, and local cache 322. User application program 302 interacts with the domain name system through internal resolver 304. For example, user application program 302 may send a user query, such as user query 306, to a domain name system and receive user responses, such as user responses 308, from the domain name system via internal resolver 304. The format of user queries 306 and user response 308 is specific to client host 310 and its operating system. User queries 306 will typically be operating system calls, and internal resolver 304 and local cache 322 will be part of the host operating system for local host 310. Less capable hosts may choose to implement internal resolver 304 as a subroutine to be linked in with every program that needs its services. Internal resolver 304 answers user queries 306 with information it acquires via queries 312 to and responses 314 from foreign name servers and references 326 to local cache 322. Internal resolver 304 stores information received from responses 314 in local cache 322 and retrieves information from local cache 322 through references 326.

Note that internal resolver 304 may have to make several queries 312 to several different foreign name servers, such as foreign name server 316, foreign name server 318, and foreign name server 320, to answer user query 306, and hence the resolution of user query 306 may involve several network accesses and an arbitrary amount of time.

The learning curve for the connection for a user's application may be reduced by embodiments of the present invention using a domain name system query, such that a period of time spent setting up required transmission control protocol parameters for the connection is reduced. In addition to reducing the learning curve for the current connection, saving changes to the transmission control protocol connections over time may provide a means for reducing the learning curve for subsequent connections using the same subnet path, whether the connections are configured by the same application program accessing the same data server or another application program that accesses the same data server over the same subnet path, regardless of whether the other application program resides on the same client or another client. Because the transmission control protocol connection parameters may be the same or similar for user applications sharing the same subnet or the same domain, the use of previously established transmission control protocol connection parameters on the same subnet or the same domain may reduce the set up time for applications on the same subnet or the same domain.

Embodiments of this invention use a method for reducing the learning curve of a transmission control protocol connection, wherein the foreign name server provides additional information in addition to providing name to IP address mapping. For example, a user application programs may use an application program interface to interactively query DNS using a GetHostByName query. The GetHostByName query is used by the application program to obtain the Internet address corresponding to a given hostname. Embodiments of the present invention modify the domain name system such that when user application programs use application program interfaces to query the domain name system, these user application programs may obtain other types of unsolicited information, including transmission control protocol connection parameters.

For example, a foreign name server may supply unsolicited additional information in an additional information field. This unsolicited additional information may include, but is not limited to, transmission control protocol connection parameters such as round trip time, duplicate acknowledgement threshold, next-hop router, path maximum transmission units, and the like.

Round Trip Time (RTT) is a measure of the current delay on a network, found by timing a packet bounced off some remote host.

Duplicate acknowledgement threshold (ACK TH), for which the default is set to three, is used for transmission control protocol fast retransmit when packet reordering is occurring on the network. The transmission control protocol data sender only retransmits a packet after a retransmit timeout has occurred, or after three (default value) duplicate acknowledgements have arrived triggering the fast retransmit algorithm.

A next-hop router is learned from Internet control message protocol (ICMP) redirects or any dead gateways detected. If a user sends data over two routers, a primary router and a secondary router, and a redirect to the secondary router occurs, the secondary router becomes the next-hop router.

Another parameter is based upon problems related to path maximum transmission units (PMTU) discovery due to firewalls filtering Internet control message protocol packets, whereby the maximum transmission units are limited based upon the path taken by the data transmission through various routers, with the maximum transmission units of the most limited path determining the maximum transmission units for the data transmission.

The unsolicited additional information obtained from the foreign name server may be saved in the library for the foreign name server for a given Internet protocol (IP) address on a subnet or domain basis. User application programs may send these transmission control protocol connection parameters to the kernel for the operating system so that the connection may be established faster and the transmission control protocol does not have a longer learning curve.

Figure 4:
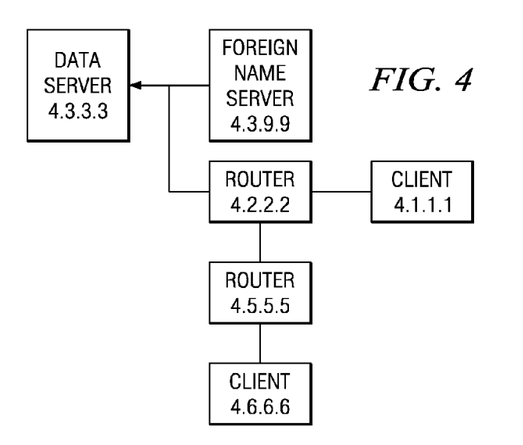
FIG. 4 is a block diagram illustrating examples of components used for querying a domain name system using components illustrated in FIG. 3, according to an illustrative embodiment of the present invention.

FIG. 4 is a block diagram illustrating examples of components used for querying a domain name system using components illustrated in FIG. 3, according to an illustrative embodiment of the present invention. In this illustrative embodiment, client 4.1.1.1 and client 4.6.6.6 are on two different subnets. When client 4.1.1.1 sends a query interactively using the domain name system GetHostByName method through router 4.2.2.2 for data server 4.3.3.3, foreign name server 4.3.9.9 returns the name, class, record type, and data for the query. An example of this information is shown in Table 1.

TABLE 1

| Name | Class | Record type | Data |
|---|---|---|---|
| DataServer | IN | A | 4.3.3.3 |
| RTT | TCP | rtt | 120 ms |
| ACK TH | ATH | ack_th | 6 |
| Router | RT | router | 4.2.2.2 |
| PMTU | TCP | mtu | 16K |

As shown in Table 1, if client 4.1.1.1 sends a query for data server 4.3.3.3, foreign name server 4.3.9.9 returns the name "DataServer," the class "IN," the record type "A," and the data "4.3.3.3" for data server 4.3.3.3. Foreign name server 4.3.9.9 translated the hostname "DataServer," the unique name by which the data server computer is known on the network, into an Internet address, the 32-bit host address usually represented in dotted decimal notation, such as "4.3.3.3." As described above, this use of DNS GetHostByName method is the current use for the method, and currently used by many user application programs and their application program interfaces.

However, when using embodiments of the present invention, the foreign name server provides additional information in addition to providing name to IP address mapping. Embodiments of the present invention provide unsolicited additional information in the additional information field that includes, but is not limited to, transmission control protocol parameters. The user application program uses an application program interface to interactively query DNS using the DNS GetHostByName method. When client 4.1.1.1 sends the query for data server 4.3.3.3, foreign name server 4.3.9.9 returns unsolicited additional information in the additional information field, including the name "RTT," the class "TCP," the record type "rtt," and, in this instance, the data "120 ms" for data server 4.3.3.3, in the additional information field. Round trip time is used by some routing algorithms to aid in calculating optimal routes.

When client 4.1.1.1 sends the query for data server 4.3.3.3, foreign name server 4.3.9.9 returns further unsolicited additional information in the additional information field, including the name "ACK TH," the class "ATH," the record type "ack_th," and, in this instance, the data "6" for data server 4.3.3.3, in the additional information field. Duplicate acknowledgement threshold (ACK TH) is usually maintained to differentiate between packet reordering and packet drop.

When client 4.1.1.1 sends the query for data server 4.3.3.3, foreign name server 4.3.9.9 returns even more unsolicited additional information in the additional information field, including the name "Router," the class "RT," the record type "router," and, in this instance, the data "4.2.2.2" for data server 4.3.3.3, in the additional information field. A next-hop router is learned from receiving an Internet control message protocol redirect or detecting a dead gateway, which may help clients on the subnet who do not have the dead gateway detection feature.

When client 4.1.1.1 sends the query for data server 4.3.3.3, foreign name server 4.3.9.9 returns yet more unsolicited additional information in the additional information field, including the name "PMTU," the class "TCP," the record type "mtu," and, in this instance, the data "16K" for data server 4.3.3.3, in the additional information field. Any path maximum transmission units (PMTU) discovery failure for a destination because of firewall filtering Internet message control protocol (ICMP) packets will assist clients on the subnet to determine the maximum number of transmission units for a particular path at the time of the transmission control protocol connection. Foreign name server 4.3.9.9 may return any unsolicited additional information in the additional information field, including, but not limited to the transmission control protocol connection parameters in this example.

In summary, foreign name server 4.3.9.9 returns unsolicited additional information in the additional information field, including all, some, none, or any combination of the following data for data server 4.3.3.3: "4.3.3.3" is the 32-bit host address represented in dotted decimal notation, "120 ms" is the round trip time, "6" is the acknowledgement threshold, "4.2.2.2" is the next hop router, and "16 K" is the path maximum transmission units. The user application program sends this additional information to the kernel of the operating system to be used to configure the transmission control protocol connection by setting the socket options through the setsockopt routine.

The setsockopt function sets the current value for a socket option associated with a socket of any type, in any state. Options can exist at multiple protocol levels, and options affect socket operations, such as whether expedited data is received in the normal data stream, and whether broadcast messages can be sent on the socket. There are two types of socket options, Boolean options that enable or disable a feature or behavior, and options that require an integer value or structure.

The kernel of the operating system uses the setsockopt function to set the socket options using the transmission control protocol connection parameters most recently used and stored at the foreign name server for the subnet path from the application program to the host. Using the most recently used transmission control protocol connection parameters minimizes the number of adjustments to the transmission control protocol connection parameters that have to be made over time made by the kernel of the operating system, resulting in a reduced learning curve for the transmission control protocol connection.

Similarly, when client 4.6.6.6 sends a query interactively using the DNS GetHostByName method through router 4.5.5.5 and router 4.2.2.2 for data server 4.3.3.3, then foreign name server 4.3.9.9 returns unsolicited additional information in the additional information field, including the following information in Table 2. Note that the transmission control protocol connection parameters in Table 2 differ from the transmission control protocol connection parameters in Table 1 because client 4.6.6.6 takes a different path to Data Server 4.3.3.3 from the path client 4.1.1.1 takes to Data Server 4.3.3.3. Client 4.6.6.6 takes a path through both router 4.5.5.5 and router 4.2.2.2, a longer path than the path taken by client 4.1.1.1, which takes a path through router 4.2.2.2 only.

TABLE 2

| Name | Class | Record type | Data |
|---|---|---|---|
| Data Server | IN | A | 4.3.3.3 |
| RTT | TCP | rtt | 220 ms |
| ACK TH | ATH | ack_th | 9 |
| Router | RT | router | 4.5.5.5 |
| PMTU | TCP | mtu | 1500 |

As shown, the information in Table 2 that foreign name server 4.3.9.9 returns to the client differs from the information in Table 1 based on which client the query has come from or based on which domain the client is from.

Instead of the foreign name server retaining this additional information as static information for subsequent use by other clients on the same subnet, the clients on the various subnets may update this information dynamically using "nsupdate." The user application program sends this additional information to the kernel of the operating system, which sets the socket options for the transmission control protocol connection by using the setsockopt routine. During the duration of the connection, the kernel compares the adjusted real-time transmission control protocol parameters with the transmission control parameters that the kernel initially used to set the socket options for the transmission control protocol connection. If the real-time transmission control protocol parameters differ from the transmission control parameters that the kernel initially used, the kernel updates the transmission control parameters on the foreign name server by using the "nsupdate" command. This update insures that the foreign name server provides subsequent user application programs that request the transmission control protocol parameters from the foreign name server with the most current transmission control protocol parameters available.

During connection close, round trip time related information like round trip time variance and smooth round trip time is sent to the foreign name server.

Acknowledgement threshold has a default value of three, and as it is changed, such as to four or five, the updated acknowledgement threshold may be sent to the foreign name server, in order to provide this information to other clients on the subnet.

On receiving an Internet control message protocol (ICMP) redirect or detecting a dead gateway, a client may update the foreign name server with this information.

Any path maximum transmission units (PMTU) discovery failure for a destination because of firewall filtering Internet control message protocol (ICMP) packets is sent to the foreign name server, which may provide this information to other clients on the subnet.

Updating the most current transmission control protocol parameters available permits the sharing of this unsolicited additional information for a particular destination with subsequent user application programs on the same subnet, thus reducing the learning curve of the transmission control protocol connections for subsequent user application programs on the same subnet.

Figure 5:
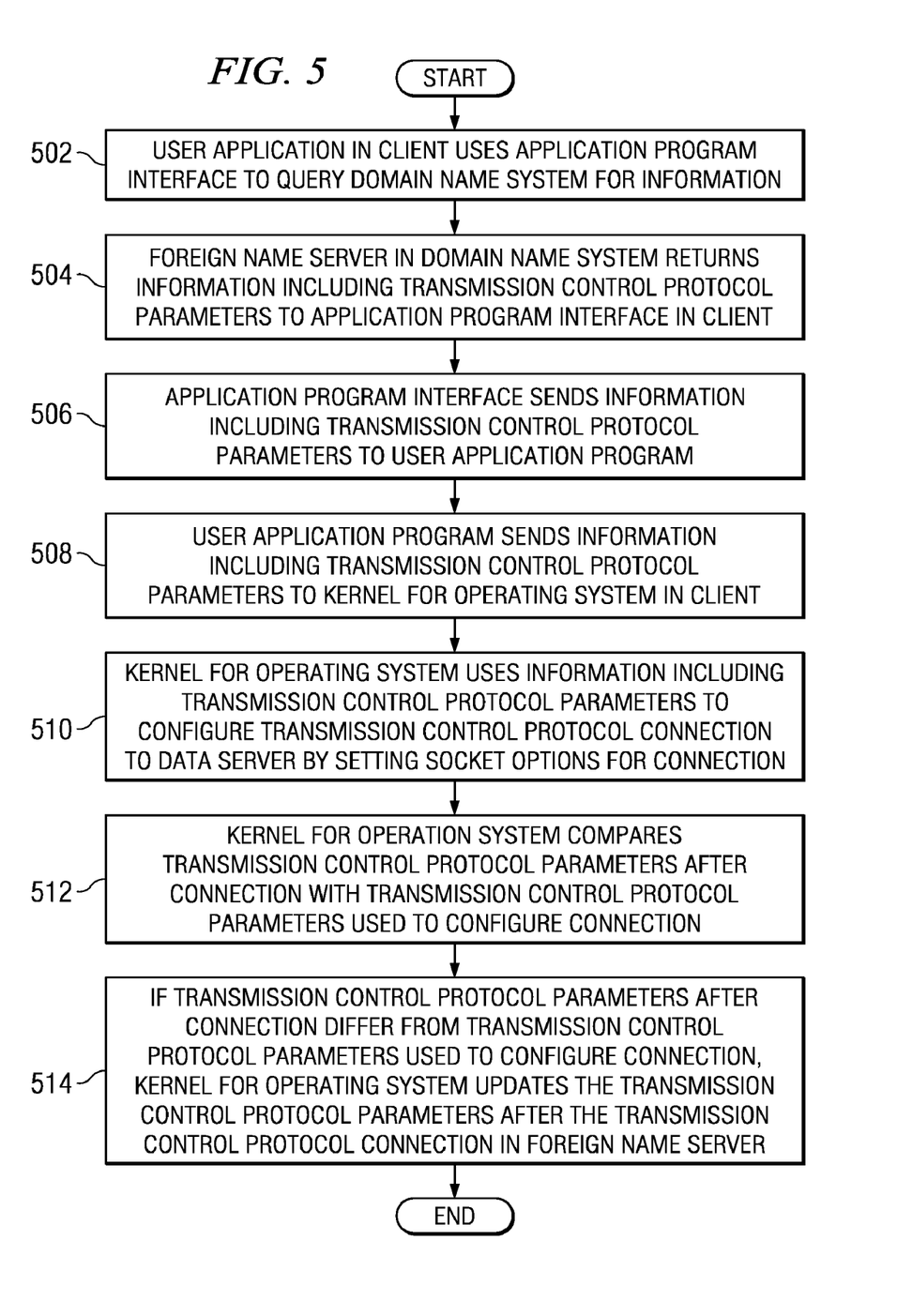
FIG. 5 is a flowchart illustrating a process used for reducing the learning curve of a transmission control protocol connection, according to an illustrative embodiment of the present invention.

Referencing FIG. 4 components, FIG. 5 is a flowchart illustrating a process used for reducing the learning curve of a transmission control protocol connection, according to an illustrative embodiment of the present invention. A user application in client 4.1.1.1 uses application program interface to query a domain name system for information (step 502). Next, foreign name server 4.3.9.9 in the domain name system returns solicited information, and unsolicited additional information in the additional information field, which includes transmission control protocol parameters to the application program interface in client 4.1.1.1 (step 504). After that, the application program interface in client 4.1.1.1 sends information including transmission control protocol parameters to the user application program (step 506). Then the user application program sends information including transmission control protocol parameters to the kernel for the operating system in client 4.1.1.1 (step 508). Subsequently, the kernel for the operating system uses information including transmission control protocol parameters to configure the transmission control protocol connection to data server 4.3.3.3 by setting the socket options for the connection (step 510).

Furthermore, the kernel for the operating system in client 4.1.1.1 compares the transmission control protocol parameters after the connection with the transmission control protocol parameters used to configure the connection (step 512). If the transmission control protocol parameters after the connection differ from the transmission control protocol parameters used to configure the transmission control protocol connection, the kernel for the operating system in client 4.1.1.1 updates the transmission control protocol parameters used to configure the transmission control protocol connection in foreign name server 4.3.9.9 (step 514).

Altogether, the components and process as shown in FIGS. 4 and 5 provide an improved method for propagation of filter expressions across multi-layered systems.

The invention can take the form of an entirely hardware embodiment, an entirely software embodiment, or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer readable storage medium can be an electronic, magnetic, optical, electromagnetic, infrared, or semiconductor system, apparatus, or device. Examples of a computer-readable storage medium include a semiconductor, a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for configuring a transmission control protocol (TCP) connection, the computer implemented method comprising:
   querying, using a processor, a domain name system for an Internet Protocol (IP) address of a desired host;
   receiving, from a name server in the domain name system, the IP address and a previously used TCP parameter for a TCP connection to the desired host, wherein the previously used TCP parameter is a TCP parameter that was used to configure a TCP connection with the desired host before the querying step;
   using, by a user application program that initiated the query, the IP address and the previously used TCP parameter to configure a current connection with the desired host;
   maintaining, at the domain name system, a set of previously used TCP parameters for a plurality of previous connections with a plurality of hosts; and
   responsive to receiving a request from the user application program for a requested IP address of a host in the plurality of hosts, sending the previously used TCP parameter from the set of previously used TCP parameters maintained at the domain name system to the user application program, wherein the set of previously used TCP parameters comprise a round trip time, a duplicate acknowledgement threshold, a next-hop router, and path maximum transmission units.

2. The computer implemented method of claim 1 further comprising:
   comparing a current TCP parameter associated with the current TCP connection against the previously used TCP parameter; and
   responsive to the current TCP parameter differing from the previously used TCP parameter, updating the previously used TCP parameter in the domain name system with a value from the current TCP parameter.

3. The computer implemented method of claim 2 wherein the updating step updates the current TCP parameter in an additional information field in the domain name system, and wherein the comparing step is performed by the user application program that initiated the query.

4. The computer implemented method of claim 1 wherein the querying step and the receiving step are executed by an internal resolver.

5. The computer implemented method of claim 1 wherein the receiving step and the using step are executed by the user application program that initiated the query.

6. The computer implemented method of claim 1 wherein the previously used TCP parameter comprises at least one of a round trip time, a duplicate acknowledgement threshold, a next-hop router, and path maximum transmission units.

7. The computer implemented method of claim 1 further comprising:
   maintaining at the domain name system a set of previously used TCP parameters that are specific to addresses for client applications in a particular subnet; and
   responsive to detecting that the query is from a client application in the particular subnet, sending the set of previously used TCP parameters to the client application.

8. A data processing system for configuring a transmission control protocol (TCP) connection, comprising:
   a bus;
   a storage device connected to the bus, wherein the storage device comprises a plurality of computer usable code;
   a communications unit connected to the bus; and
   a processing unit connected to the bus, wherein the processing unit executes the plurality of computer usable code to query a domain name system for an Internet Protocol (IP) address for a desired host to form a query, receive, from a name server in the domain name system, the IP address and a previously used TCP parameter for a TCP connection to the desired host, wherein the previously used TCP parameter is a TCP parameter that was used to configure a TCP connection with the desired host before the query, use, at a user application program interface that initiated the query, the IP address and the previously used TCP parameter to configure a current TCP connection with the desired host, maintain, at the domain name system, a set of previously used TCP parameters for a plurality of previous connections with a plurality of hosts, and responsive to receiving a request from the user application program for a requested IP address of a host in the plurality of hosts, send the previously used TCP parameter from the set of previously used TCP parameters maintained at the domain name system to the user application program, wherein the set of previously used TCP parameters comprise a round trip time, a duplicate acknowledgement threshold, a next-hop router, and path maximum transmission units.

9. The data processing system of claim 8, wherein the processing unit further executes the plurality of computer usable code to compare a current TCP parameter associated with the current TCP connection against the previously used TCP parameter, and update the previously used TCP parameter in the domain name system with a value from the current TCP parameter if the current TCP parameter is different than the previously used TCP parameter.

10. The data processing system of claim 9, wherein in executing the plurality of computer usable code to update the processing unit further executes the plurality of computer usable code to update the current TCP parameter in an additional information field in the domain name system, and wherein the processing unit executing the plurality of computer usable code to compare the current TCP parameter associated with the current TCP connection against the previously used TCP parameter is performed at the user application program that initiated the query.

11. The data processing system of claim 8, wherein the processing unit executing the plurality of computer usable code to query the domain name system for the IP address for a desired host to form a query and receive, from the name server in the domain name system, the IP address and the previously used TCP parameter for the TCP connection to the desired host are executed using an internal resolver.

12. The data processing system of claim 8 wherein the previously used TCP parameter comprises at least one of a round trip time, a duplicate acknowledgement threshold, a next-hop router, and path maximum transmission units.

13. The data processing system of claim 8, wherein the processing unit further executes the plurality of computer usable code to maintain at the domain name system a set of previously used TCP parameters that are specific to addresses for client applications in a particular subnet; and sending the set of previously used TCP parameters to a client application in the particular subnet in response to detecting that the query is from the client application in the particular subnet.

14. A computer program product for configuring a transmission control protocol (TCP) connection, the computer program product comprising:
- a computer readable storage device having a plurality of computer usable program code embodied therein;
- the plurality of computer usable program code configured to cause a processor of a computer to query a domain name system for an Internet Protocol (IP) address for a desired host to form a query;
- the plurality of computer usable program code configured to cause the processor to receive, from a name server in the domain name system, the IP address and a previously used TCP parameter for a TCP connection to the desired host, wherein the previously used TCP parameter is a TCP parameter that was used to configure a TCP connection with the desired host before the query;
- the plurality of computer usable program code configured to cause the processor to use, by a user application program that initiated the query, the IP address and the previously used TCP parameter to configure a current TCP connection with the desired host
- the plurality of computer usable program code configured to cause the processor to maintain, at the domain name system, a set of previously used TCP parameters for a plurality of previous connections with a plurality of hosts; and
- the plurality of computer usable program code configured to cause the processor, responsive to receiving a request from the user application program for a requested IP address of a host in the plurality of hosts, to send the previously used TCP parameter from the set of previously used TCP parameters maintained at the domain name system to the user application program, wherein the set of previously used TCP parameters comprise a round trip time, a duplicate acknowledgement threshold, a next-hop router, and path maximum transmission units.

15. The computer program product of claim 14 further comprising:
- the plurality of computer usable program code configured to cause the processor to compare a current TCP parameter associated with the current TCP connection against the previously used TCP parameter; and
- the plurality of computer usable program code configured to cause the processor to update the previously used TCP parameter in the domain name system with a value from the current TCP parameter if the current TCP parameter is different than the previously used TCP parameter.

16. The computer program product of claim 15, wherein the plurality of computer usable program code configured to cause the processor to update the previously used TCP parameter in the domain name system with the value from the current TCP parameter if the current TCP parameter is different than the previously used TCP parameter updates the current TCP parameter in an additional information field in the domain name system, and wherein the comparing step is performed by the user application program that initiated the query.

17. The computer program product of claim 14, wherein the plurality of computer usable program code configured to cause the processor of the computer to query the domain name system for an Internet Protocol (IP) address for the desired host to form the query and the plurality of computer usable program code configured to cause the processor to receive, from the name server in the domain name system, the IP address and the previously used TCP parameter for the TCP connection to the desired host, wherein the previously used TCP parameter is the TCP parameter that was used to configure the TCP connection with the desired host before the query are executed using an internal resolver.

18. The computer program product of claim 14 further comprising:
- the plurality of computer usable program code configured to cause the processor to maintain at the domain name system a set of previously used TCP parameters that are specific to addresses for client applications in a particular subnet; and
- the plurality of computer usable program code configured to cause the processor to sending the set of previously used TCP parameters to a client application the particular subnet in response to detecting that the query is from the client application in the particular subnet.

19. The computer program product of claim 14 wherein the previously used TCP parameter comprises at least one of a round trip time, a duplicate acknowledgement threshold, a next-hop router, and path maximum transmission units.

* * * * *